United States Patent [19]

Ritter et al.

[11] Patent Number: 5,231,475
[45] Date of Patent: Jul. 27, 1993

[54] METHOD AND APPARATUS FOR GENERATING VIDEO SIGNAL REPRESENTING CONTROLLABLE COLOR MATTE

[75] Inventors: David W. Ritter, Newark, Calif.; Anthony R. Bianchini, West Chester; Michael L. Richardson, Sugarloaf, both of Pa.

[73] Assignee: Videotek, Inc., Pottstown, Pa.

[21] Appl. No.: 481,508

[22] Filed: Feb. 16, 1990

[51] Int. Cl.⁵ .................. H04N 9/74; H04N 5/262; H04N 5/272

[52] U.S. Cl. .................. 358/22; 358/19; 358/28; 358/81; 358/183

[58] Field of Search ............. 358/22, 82, 81, 29, 358/28, 27, 19, 183

[56] References Cited

U.S. PATENT DOCUMENTS

4,689,682  8/1987  Jackson ..................... 358/22
4,809,070  2/1989  Lake ........................ 358/37

Primary Examiner—Tommy Chin
Attorney, Agent, or Firm—Eckert Seamans Cherin & Mellott

[57] ABSTRACT

A matte synthesizer and method generates baseband video signal information from user inputs for selecting levels of luminance, saturation and hue. The synthesizer includes continuously variable controls for inputting user selections over respective ranges of adjustment, a processor programmed to calculate directly a plurality of discrete amplitude samples in a chroma cycle of a video signal corresponding to a periodic wave at a baseband frequency of the video signal with a DC level determined by the luminance, a peak-to-peak amplitude determined by the saturation, and a phase shift relative to a reference burst determined by the hue, and a multiplexing method operable to read out the discrete amplitude samples to an output, during each cycle of the chroma baseband frequency. The discrete amplitude samples are calculated for a vertical field of the composite video signal and displayed during the next field. The signal thus obtained is filtered and superimposed with a synchronizing signal. The resulting matte signal can be displayed on a standard color television monitor. The repetitive output can be provided by sequentially and repetitively routing calculated amplitude values through a digital to analog converter and summing the output with synchronizing information.

20 Claims, 2 Drawing Sheets

METHOD AND APPARATUS FOR GENERATING VIDEO SIGNAL REPRESENTING CONTROLLABLE COLOR MATTE

BACKGROUND OF THE INVENTION

1. Field of the Invention

This invention relates to the field of video matte or background generators, and in particular to a color matte synthesizer that calculates from user control inputs respecting luminance, saturation and hue, a plurality of amplitude samples that fully define one period of chroma cycle of a video signal corresponding to the user's selections, these amplitude samples then being sequentially read out in time division multiplex manner and superimposed with synchronizing information, to produce the desired video matte in a signal that can be displayed on a standard color television monitor.

2. Prior Art

Matte generators have been in use for some time in the video production industry. The user generally selects, using potentiometers, a desired luminance, saturation and hue for the matte display. The conventional matte generator uses algorithms or electronic circuitry to produce analog signals relating to the primary video colors, namely red (R), green (G) and blue (B). The R, G and B signals are then electronically encoded to form a composite baseband video signal if the matte is to be displayed on a standard television monitor.

U.S. Pat. No. 4,636,839—Cole et al discloses a matte generator that converts luminance, saturation and hue to RGB levels in a microprocessor. The microprocessor computes difference values R-Y, B-Y and also luminance (Y), along with an address, this computation being effected once for each video field. The apparatus is complex in that multiple conversions are required, namely from luminance/saturation/hue to RGB to R-Y/B-Y/Y. The disclosure does not teach a method or apparatus for converting the calculated values (once per field) to a signal which might be displayed on a standard video monitor, the addition of which would further increase the complexity of the apparatus.

U.S. Pat. No. 4,758,880—McFetridge discloses another complex system, in this case generating a video matte signal which must be decoded to produce a baseband video signal for displaying the matte. The system relies on two subcarrier oscillators in quadrature. A digital to analog converter is used to produce relatively steady state DC values (during the vertical interval time), which are used to control in-phase and quadrature modulators. Like Cole et al, McFetridge goes through an encoding stage before attempting to generate composite baseband video. The present invention, on the other hand, uses a microprocessor to proceed directly from control inputs to samples defining the luminance, saturation and hue information, which samples are read out sequentially and repeatedly during the viewable portion of the video, then added to synchronization signals to reproduce a composite video matte signal in a direct and uncomplicated manner.

Additional devices are known for processing an existing video signal to correct or adjust luminance, saturation and/or hue. These are not matte synthesizers. Reference can be made, for example to U.S. Pat. No. 4,642,682—Orsburn et al; U.S. Pat. No. 4,542,402—Ader; and, U.S. Pat. No. 4,809,059—Flamm et al. The systems disclosed do not synthesize chroma signals and are complicated. The typical output is not composite video, but rather is RGB, R-Y/G-Y/Y or the like, to be further processed in a television receiver or the like.

U.S. Pat. No. 4,442,428—Dean et al discloses a limited capability matte generator. The available colors are not variable, a limited subset of colors being selectable by the user. Additional disclosures which do not concern matte synthesizers but may be of interest in the field of video signal processing can be found in U.S. Pat. No. 4,404,583—Tatami; U.S. Pat. No. 4,176,373—Dillone et al; and U.S. Pat. No. 4,327,373—Giomi.

Unlike the prior art, the present invention synthesizes a video baseband output directly from selections at continuously adjustable user inputs inputs for luminance, saturation and hue. The inputs and outputs are high in resolution, yet the device is versatile and uncomplicated. These features are achieved by digitizing user control inputs for the three variables, calculating the level of the corresponding baseband video signal at a plurality of sequential samples in the period of the subcarrier, and reproducing the baseband video output by repetitively reading out the samples, thereby obtaining the required level and phase relationships needed.

SUMMARY OF THE INVENTION

It is an object of the invention to produce a widely variable baseband video matte signal from user inputs, with a minimum of circuit complexity and expense.

It is another object of the invention to define and directly produce a video baseband color matte signal directly by digital calculations based on the user selections rather than by signal processing.

It is a further object of the invention to define by digital calculations and to produce amplitude samples which completely define a chroma cycle of a video signal at a desired luminance, saturation and hue, and to repetitively read out the samples to provide a baseband chroma signal, inserting standardized synchronizing signals to thereby synthesize a composite video matte signal for display on a standard television monitor.

These and other objects are accomplished by a matte synthesizer for synthesizing baseband video signal information from user inputs for selecting levels of luminance, saturation and hue, and the method embodied thereby, wherein the synthesizer includes continuously variable controls for inputting user selections of luminance, saturation and hue over respective ranges of adjustment, a processor programmed to calculate a plurality of discrete amplitude samples in a chroma cycle of a composite video signal corresponding to a periodic wave at a baseband frequency of the composite video signal with a DC level determined by the luminance, a peak-to-peak amplitude determined by the saturation, and a phase shift relative to a reference burst determined by the hue, and a multiplexing method operable to read out the discrete amplitude samples to an output, during each cycle of the chroma baseband frequency. The discrete amplitude samples are calculated during a vertical field of the composite video signal and displayed during the next field. The phase shift information embodied in the selected hue is obtained from a sine function look-up table. The signal thus obtained is filtered and superimposed with a synchronizing signal, preferably including a sync pulse with standard rise and fall times. The resulting matte signal can be displayed on a standard color television monitor. The manually displaceable controls can be potentiometers connected to one or more analog to digital converters and the repetitive output can be provided by routing calculated amplitude values through a digital to analog converter which can be blanked during the vertical and horizontal intervals and superimposed with synchronizing signals.

BRIEF DESCRIPTION OF THE DRAWINGS

There are shown in the drawings the embodiments of the invention as presently preferred. It should be understood that the invention is capable of embodiment in other specific combinations of subelements in accordance with the disclosure and claims. In the drawings:

DETAILED DESCRIPTION OF THE PREFERRED EMBODIMENTS

The invention digitally synthesizes continuously variable amplitude samples with respect to parameters relating to luminance, saturation and hue of a uniform color signal for display on a conventional television monitor. This single color display is described as a matte display. The matte display can be, for example, an output to be used in conjunction with a video effects switcher. The matte display format is preferably selectable to be compatible with either NTSC or PAL systems.

The user interface controls preferably are three DC potentiometers, respectively controlling luminance, saturation and hue by providing signal levels which the user varies within predetermined ranges. In the baseband video signal, luminance is the average DC signal level; saturation is the peak to peak amplitude of the chroma information; and, hue relates to the phase relationship of the chroma signal to a reference. Using the potentiometers, the user varies these parameters relative to their maximum and minimum displacements. The luminance and saturation are varied within levels useful to the matte display generating device or other apparatus which is to use the synthesized video matte signal. The hue is varied in phase between 0° and 360° relative to the reference, as a means to encode a particular user selected color. The color is displayed during a next video field. The reference is externally applied or locally generated, in the form of a standard chroma burst sample located in time after each horizontal synchronizing pulse of a composite black burst signal.

According to the invention, the voltage at the output of the interface controls is converted to a digitally coded format by an analog to digital converter (ADC). Digital (numeric) codes corresponding to the relative positions of the interface control potentiometers or the like along their ranges become the input variables to a digital processor algorithm which is preferably permanently stored in a read only memory (ROM). The algorithm calculates a plurality of time invariant amplitude samples for a single period of the uniform baseband chroma sine wave directly from the input data respecting luminance, saturation and hue. Preferably, four samples are calculated at 90° intervals of the chroma cycle.

The calculated digital samples from the processor are stored in data latches for repetitive conversion to an analog signal by means of a digital to analog converter (DAC). The four amplitude samples are sequentially presented to the DAC for conversion to an analog voltage level once during every cycle of the chroma frequency in a time division multiplexing arrangement such that the defined chroma signal is read out continuously. The four individual samples are provided to the DAC every 69.84 nanoseconds (or 56.39 $\eta$S for PAL), which is exactly 90°, or $\frac{1}{4}$ of the chroma cycle. The clocking for presenting the samples at $\frac{1}{4}$ cycle intervals is preferably obtained by a phase locked loop having a phase comparator sensing a reference subcarrier and a voltage controlled oscillator (VCO) operating at four times the subcarrier frequency. Other integral multiples are possible, but four is preferred. The second input to the phase comparator is derived from dividing the VCO output by four. The four samples completely describe the viewable portion of the video baseband signal with respect to luminance, saturation and hue.

The DAC is preferably the multiplying type and the output is blanked (set to zero volts) during the normal horizontal and vertical blanking periods. A sync separator responsive to the input reference black signal can trigger blanking by zeroing the multiplying input to the multiplying digital to analog converter. Preferably, the multiplying signal is provided with sloped edges to obtain the standard video rise and fall time of 300 $\eta$S in the output of the digital to analog converter. This is accomplished by inserting an integrator between a switched reference DC voltage and the multiplying input, the integrator time constants defining the rise and fall times. The output signal is filtered to remove frequency components above the baseband chroma frequency (i.e., 3.759545 MHz for NTSC, or 4.4336180 MHz for PAL). A reference black burst signal is superimposed at the appropriate point by conventional analog means, to provide the necessary synchronizing information such that the composite video output can by displayed on a standard color television monitor.

Timing and synchronization are accomplished using a phase locked loop, voltage controlled oscillator operating at an integer multiple (i.e., four) times the subcarrier frequency and phase locked to a reference chroma burst. The reference chroma burst is supplied by the same reference black burst which is added to the DAC/filter output to provide synchronizing information. The operating frequencies are 14.318180 MHz for an NTSC system or 17.7344750 MHz for a PAL system. The divided oscillator output is decoded and four individual pulses are generated. These pulses are presented to the data latches to enable the contents of each latch to be available in turn to the DAC. Each pulse occurs once during each chroma cycle and the duration of each pulse can be equal to $\frac{1}{4}$ of the chroma cycle. These latch-enable pulses occur at a consistent and specific time relative to the phase of the subcarrier burst, enabling accurate synthesis of the signal desired by the user.

Figure 1:
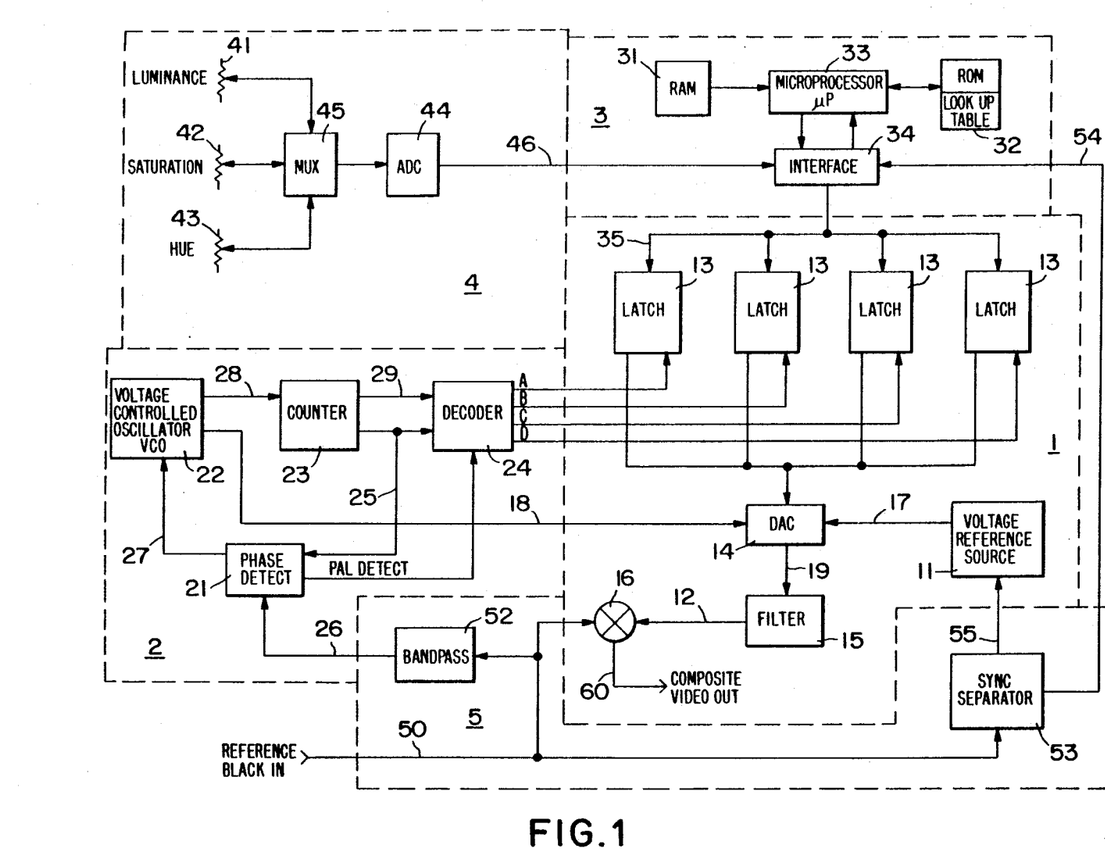
FIG. 1 is a schematic block diagram illustrating a color video matte synthesizer according to the invention; and, FIG. 2 is a schematic diagram illustrating an edge sloping means for achieving predetermined rise and fall times in a composite video output.
Figure 2:
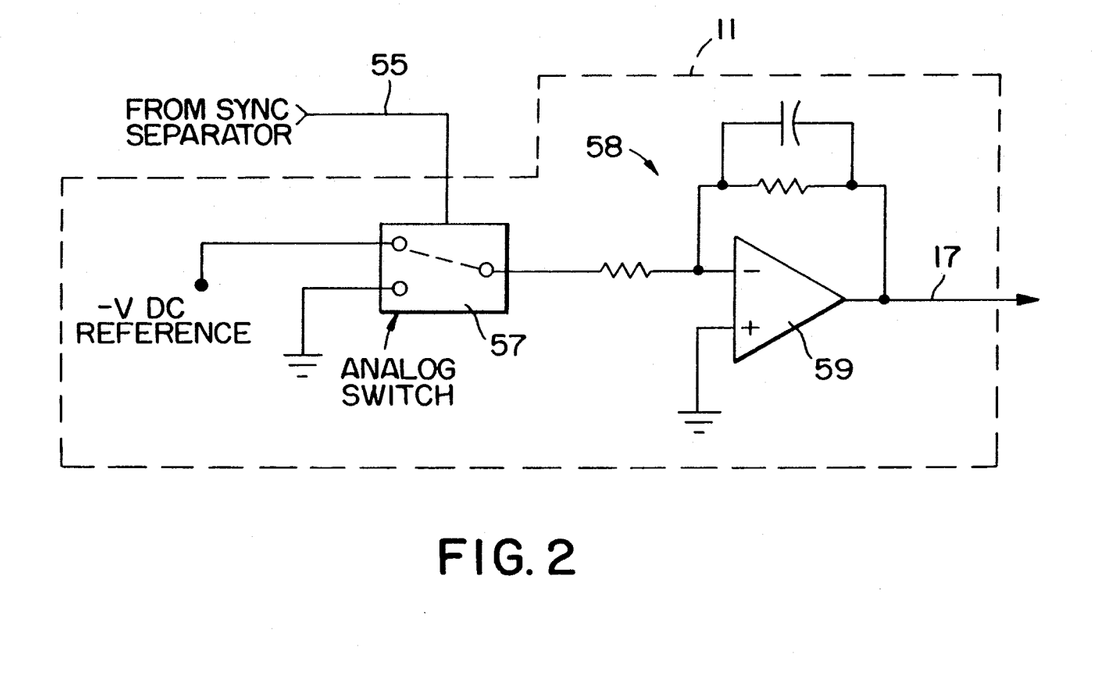

A block diagram illustrating an embodiment of the system is shown in FIG. 1, wherein the matte synthesizing apparatus is divided into five main circuit sections, namely the synthesizer 1, phase locked loop 2, microcontroller 3, user interface 4 and black processor 5. These elements can be provided as a unit or incorporated in a larger apparatus, such as a video effects switcher. FIG. 2 represents an element of the voltage reference 11, responsive to triggering by the sync separator 53 to provide the blanking multiplying signal, with the appropriate rise and fall times.

Reference black burst 50 is applied to provide a black reference via black processor 5. Reference black burst 50 is routed to the sync separator 53, where composite blanking 55 is generated to blank the reference voltage source 11. Vertical blanking 54 is separated and applied to the microprocessor (uP) 33 through the interface 34 to indicate the start of vertical blanking. Chroma burst is separated in bandpass filter 52, and applied to the reference input 26 of the phase detector 21 in the phase locked loop (PLL) 2.

The voltage-controlled oscillator (VCO) 22 operates at an integer multiple of the reference subcarrier frequency corresponding to the number of samples to be used in defining a cycle of the baseband video output. In the preferred embodiment four samples are used. The VCO output at the integer multiple of the subcarrier is used as the clocking input 28 to binary counter 23. The two least significant digit outputs 29, 25 of the binary counter 23 are applied in the preferred embodiment to a two to four line decoder 24. The outputs A through D of the decoder 24 come true one at a time and are connected as the enable inputs to four identical data latches 13, each of which has a plurality of bits defining numerically the analog level to be placed on the output of the DAC during a corresponding time slot. In addition to forming an input to decoder 24, the divide by four output 25 from the counter 23 is also the signal input to the phase detector 21 whereby the VCO output is compared to the subcarrier reference frequency as defined by the burst. The phase error voltage 27 is applied to control the VCO 22 such that necessary phase and frequency corrections are effected in a closed loop controlled manner and the VCO output tracks the frequency and phase of the burst.

User interface 4 contains three potentiometers connected between fixed voltage levels, namely potentiometers 41 for selecting luminance, 42 for saturation and 43 for hue. The settings of these three potentiometers fully define the desired matte display. The relative position of each potentiometer selects a DC voltage, for example between zero and 12 volts, which voltage appears on the wiper of the potentiometer. The position voltages from the respective potentiometers can be time division multiplexed to the input of analog to digital converter (ADC) 44, using multiplexer 45, such that the potentiometer position voltages are sequentially presented to the ADC for conversion to digital format. The digitally coded levels are then read by microcontroller 3 via data bus 46.

The microcontroller 3 preferably incorporates read only memory (ROM) 32 for nonvolatile storage of the coded algorithm and numerical constants needed for synthesizing the matte display. A random access memory (RAM) 31 is included for volatile storage as necessary for operation of the microcontroller, for example for data storage. Microcontroller 3 is connected into the system through interface 34, which is a circuit block utilizing bus transceivers for the data lines and decoder/drivers for the address lines. The microcontroller and its interface can be varied somewhat within the scope of the invention, provided means are included for executing the coded algorithm by which the baseband video waveform is calculated from the three user inputs. This process is described in detail hereinafter.

The microprocessor 33 of microcontroller section reads the luminance 41, saturation 42 and hue 43 information from the potentiometer controls via interface 34. The particular digitized voltages can be converted by the processor to a percentage of full scale, e.g., for expressing hue, the voltage input at the potentiometer is interpreted as an angle between 0° and 360°. Preferably, the hue control has a span slightly in excess of 360° to ensure that the full 360° is available, however the span above 360° has of course the same effect as the beginning of the span. These values are the input variables to the algorithm which calculates four amplitude samples of a sine wave with respect to the parameters luminance, saturation and hue. The amplitude samples are stored in latches 13 for fast access by the digital to analog converter (DAC) 14. Addressing and data transfer to the latches is preferably done under control of the microprocessor 33, through the interface 34. The discrete amplitude samples are preferably steady state relative to video line time. Changes to the levels defined by the potentiometers 41, 42, 43 are preferably processed and the required sample data stored in latches 13 during the vertical interval, whereupon the sample data remains constant for the next video field. The four latches 13 are enabled by pulses A, B, C and D from the decoder 24. Each latch is enabled once each chroma cycle in sequential order as counter 23 counts from zero to three, while the DAC 14 receives a convert signal 18 from the 4*SC oscillator 22 coincident with a latch enable pulse A, B, C or D. The DAC 14 thus generates four discrete analog samples for each chroma cycle as calculated by the processor. The enable sequence for the latches (i.e., decoder 24 output) is locked to the phase of the reference chroma burst 26 by using the same divide by four counter output 25 to drive the decoder and the phase detector 21. This guarantees that the hue of the synthesized matte display will be consistent with respect to the phase of the given reference chroma burst.

The DAC 14 is preferably a multiplying type DAC, having an input for varying the full scale output of the DAC, whereby the DAC output can be zeroed by zeroing the multiplying input. This analog input 17 to the DAC is a zero to two volt signal from the voltage reference source 11. The zero volt level corresponds in time to the blanking of reference black burst 50 and the two volt level corresponds to the viewable picture information time. The rise and fall time of the reference voltage input as the multiplying input to DAC 14 is 300 ηS, whereby the same rise and fall time appear in the output of DAC 14. This provides the correct shape for NTSC and PAL standards.

As shown in FIG. 2, the voltage reference source 11 preferably includes an analog switch 57 for switching between two DC voltages levels, e.g., −2 V and ground, under control of the sync separator 53, which obtains the sync from the reference black signal 50. The switched signal is passed through integrator 58, which defines an edge sloping means operative to provide a 300 ηS rise time and fall time. The integrator 58 includes an op amp 59, with the edges of the output 17 to the DAC being sloped by charging and discharging of the capacitor in the feedback path through the series and parallel resistors.

The DAC output 19 is roughly a square or stairstep wave at the multiplexing rate defined by VCO output 28. Filtering 15 removes the sampling components of the conversion process and the resulting filter output signal 12 is a sine wave (with video blanking) at the chroma frequency. The sine wave output has a DC level determined by the position of the luminance control 41; a peak-to-peak amplitude determined by to the saturation control 42; and, a relative phase determined by the hue control 43. An analog adder 16 sums the signal with a reference black burst to form the composite video output 60, which can be viewed on a standard television receiver.

The matte synthesizer of the invention can be configured to conform to PAL standards or can be switchable between NTSC and PAL, by providing for minor modifications. First, the proper reference black burst must be applied to the input connector 51. The oscillator 22 must be set to operate at four times the correct chroma frequency. The phase detector 21 must be able to detect the presence of a reference chroma burst which is alternating by ±45° according to the PAL standard, which can be detected. The detect signal for PAL changes sense each line in conjunction with the PAL burst. This signal is sent to the decoder to signal a phase change and thereby effect a change in the latch enable pulse output sequence. That is, for NTSC the latch enable sequence would be A-B-C-D, A-B-C-D, etc., line after line. For PAL, the sequence would be A-B-C-D for one line and then A-D-C-B for the next line. The apparatus of the invention can be switchable between PAL and NTSC operation, can detect PAL by sensing a phase change in the reference burst, or can include nonswitchable means for producing the matte signal in either or both formats.

The algorithm by which the microcontroller determines the amplitude samples which are loaded into latches 13 and output sequentially to DAC 14, allows the baseband video signal to be calculated directly as a function of the input selections at potentiometers 41, 42 and 43. Incorporated in the procedure is an active clipping step that keeps any illegal (out of range) amplitude samples from being generated.

A look-up table of numerical constants is preferably included in the information stored in ROM 32, containing unit values of the sine function for a plurality of phase (hue) angles at least from zero to 0.5 $\pi$ (i.e., 0 to 90°), from which the corresponding amplitudes for all angles in the cycle can be derived. Using a look-up table is convenient and is faster than calculating the values. In order to store enough information to derive the sine function over a full period, it is only necessary to store a quarter cycle of constants because the sine function is symmetrical around 90° from 0 to $\pi$ and the absolute values are the same from $\pi$ to 2 $\pi$ as from 0 to $\pi$.

After the data values of the potentiometers have been determined, the algorithm determines the value of the amplitude samples in four main steps:

1. The maximum allowable saturation level is calculated based on the selected luminance level. Saturation as selected is then limited to a value less than or equal to this maximum, thereby preventing selection of an output value that is out of range.

2. The value of the hue potentiometer is interpreted as an angle between zero and 360°. The unit sine function for this angle is determined, for example by referring to the lookup table of sine values. Three further values are calculated or looked up, being related to the first by adding 0.5 $\pi$, $\pi$ and 1.5 $\pi$ to the hue angle, and thereby provide evenly spaced samples in the unit sine function, displaced in phase relative to the reference burst by the selected hue angle.

3. Each of the four values of the unit sine function is multiplied by the saturation level.

4. The resulting values are added to or subtracted from the luminance level, to provide four amplitude samples of a sine function periodically varying around a DC level defined by the luminance and having a peak to peak amplitude defined by the saturation.

The mathematical definition of the sample values to be sequentially read into latches 13 is a follows:

$$sample_1 = luminance + saturation[sin(hue)];$$

$$sample_2 = luminance + saturation[sin(hue + 0.5 \pi)];$$

$$sample_3 = luminance + saturation[sin(hue + \pi)]; \text{ and,}$$

$$sample_4 = luminance + saturation[sin(hue + 1.5 \pi)].$$

These levels are the correct amplitude values for the baseband video output selected by the user controls, at evenly spaced points in the periodic cycle at the reference frequency, the sine wave being phase shifted relative to the reference burst by an angle determined by the selected hue. By reading out the samples and filtering out frequency components higher than the reference frequency, the desired viewable signal is achieved. This is accomplished without the need to convert the video parameter selection data into preliminary RGB data, and with a minimum of signal processing requirements.

With eight bits, ADC 44, which digitizes the user selections of luminance, saturation and hue, can have a resolution of one part in 256, or about 1.41° in hue and about 0.4% of full scale in luminance and saturation. The hue resolution is less if the control input is arranged to exceed a 360° span. This resolution provides a substantially continuous user control over the respective ranges. Additional resolution can be obtained by encoding the potentiometer values and providing a sine lookup table or calculation technique that employs more bits. It is also possible to use more than four samples during the sine wave, in which case the number of latches and the integer multiple characterizing counter 23 and n-to-m line decoder 24 would be varied accordingly.

The invention as disclosed herein is a matte synthesizer for synthesizing video baseband signal information from user inputs 41, 42, 43 respecting luminance, saturation and hue, comprising means 45, 44, 46, 34 for inputting user selections of luminance, saturation and hue over respective ranges of adjustment. Means 33 calculate a plurality of discrete amplitude samples in a chroma cycle of a video baseband signal corresponding to a periodic wave 60 at a baseband frequency 50 of the baseband video signal with a DC level determined by said luminance, a peak-to-peak amplitude determined by said saturation, and a phase shift relative to the baseband frequency determined by said hue. Repetitive means 23, 24, 13 are operable to read out sequentially the discrete amplitude samples to an output, during each chroma cycle of the baseband frequency. Means 53, 11 are included for superimposing a synchronizing signal on the output.

The means for inputting user selections can include manually displaceable controls 41, 42, 43 and an encoder 44 operable to digitize positions of the controls. The manually displaceable controls 41, 42, 43 preferably are continuously variable potentiometers and the encoder 44 includes an analog to digital converter operable to produce a numeric value corresponding to the positions of the controls. The means for calculating a plurality of discrete amplitude samples includes a digital processor 33, programmed to calculate said discrete amplitude samples at least once for a vertical field of the composite video signal, said luminance, saturation and hue remaining unchanged during a next video field. The luminance and saturation are variable within preset limits and the hue is variable from 0° to 360°. The processor 33 preferably calculates four said amplitude samples according to the equations:

$$sample_1 = luminance + saturation[sin(hue)];$$

$$sample_2 = luminance + saturation[sin(hue + 0.5\pi)];$$

$$sample_3 = luminance + saturation[sin(hue + \pi)]; \text{ and,}$$

$$sample_1 = luminance + saturation[sin(hue)];$$

A filter 15 removes from the output 19 frequency components higher than said baseband frequency 50. A phase locked oscillator 22 operating at four times the baseband reference frequency 50 can sequence the presentation of the output samples and apply said four amplitude samples to the output synchronously with an output of the phase locked oscillator 22. The digital to analog converter 14 can be a multiplying type, the apparatus further comprising means 53, 11 for applying a reference voltage 17 to the digital to analog converter 14 for blanking an output of the digital to analog converter 14 during a video blanking period of said composite video signal. The means for superimposing a synchronizing signal preferably includes means 16 for summing the output of the digital to analog converter 19 and the output of the baseband frequency during a burst interval. Means 58 for sloping the reference voltage 17 applied to the digital to analog converter 14 obtain a desired rise time in a synchronizing pulse in the composite video signal, i.e., substantially 300 $\eta$S.

The invention as defined in more detail is a matte synthesizer for synthesizing baseband video signal information comprising user inputs 41, 42, 43 respecting luminance, saturation and hue, the user inputs including user control elements which are continuously variable over ranges, each of the user inputs providing an electrical output varying with positioning of a user control element. At least one analog to digital converter 44 is operable to digitize the electrical output of each of the user inputs, providing numerical selections of luminance, saturation and hue. A digital processor 33 is programmed to read said numerical selections and to calculate and output repetitively a plurality of discrete amplitude samples in a chroma cycle of a baseband video signal corresponding to a periodic wave at a baseband frequency with a DC level determined by said luminance, a peak-to-peak amplitude determined by said saturation, and a phase shift relative to a reference black burst 50 determined by said hue. At least one digital to analog converter 14 is operable to receive from the processor 33 the discrete amplitude samples and to convert the amplitude samples to analog levels. A multiplexer 23, 24, 13 is operable to place the discrete amplitude samples sequentially and repetitively on an output at intervals during each chroma period of the baseband, whereby the samples are converted to an analog waveform. Summing means 53, 11, 14, 16 superimpose a synchronizing signal on said output.

The multiplexer is a digital multiplexer having a plurality of latches 13 for storing the discrete amplitude samples, the digital to analog converter 14 receiving the amplitude samples from the latches 13. The reference burst is provided by a reference signal 50 to the matte synthesizer, and a phase locked loop 2 including a phase comparator 21 and voltage controlled oscillator 22 are operable to track the reference burst and to produce an output 28 at a multiple of the baseband frequency corresponding to said number of the plurality of samples, the output of the voltage controlled oscillator 28 being connected to the multiplexer 23, 24, 13 for enabling sequential presentation to the digital to analog converter 14 of the discrete amplitude samples from individual ones of the latches 13. The digital to analog converter 14 preferably is a multiplying type, and said means for synchronizing includes a timing reference source 53, 11 operable to blank the output of the digital to analog converter for producing a sync pulse. Means 58 are provided for sloping a multiplying signal 17 to the digital to analog converter, whereby the sync pulse has a predetermined rise time and fall time corresponding to a slope of the multiplying signal, i.e., substantially 300 $\eta$S. A filter 15 is operable to remove frequency components from the output of the matte synthesizer at a higher frequency than the baseband frequency. The summing means 16 can include means for superimposing on said output a synchronizing burst at the baseband frequency.

The invention can also be characterized as a method, namely a method for synthesizing a matte in the form of a baseband color video signal having a user selected luminance, saturation and hue, comprising the steps of providing inputs 41, 42, 43 of the user selected luminance, saturation and hue, the luminance and saturation being variable within preset ranges and the hue being variable from 0° to at least 360°; providing a baseband frequency 50; determining values of a unit sine wave at a phase shift from a reference black burst corresponding to the hue, at a plurality of spaced points within a period of the baseband frequency; defining amplitude samples of the baseband color video signal at each of said plurality of spaced points, by multiplying the unit sine wave values times the saturation and adding the luminance; converting the amplitude samples to analog levels and placing the amplitude samples on an output synchronously with the baseband frequency and repetitively for successive cycles of the baseband frequency; and, superimposing on said output a sync pulse and a color burst at the baseband frequency.

The user selected luminance, saturation and hue are input from manually variable controls 41, 42, 43, digitized (44) and presented as numerical values to a digital processor 33 for determining said values of the unit sine wave. The unit sine wave values can be determined by reference to a look-up table 32 indexed by a phase angle of the hue. The amplitude samples are placed on the output via a digital to analog converter 14, and the method can further comprise blanking an output of the digital to analog converter during a synchronizing interval (53, 11). The digital to analog converter is preferably a multiplying type, and the method further comprises setting a predetermined rise time and fall time on the output of the digital to analog converter by sloping a multiplying signal to the digital to analog converter. The baseband frequency is provided by phase locking a controllable oscillator 22 to a reference burst signal 50, the controllable oscillator 22 being operable to produce a frequency 28 at an integer multiple of the baseband frequency corresponding to a number of said samples within a period of the baseband frequency. The analog levels can be placed on the output by multiplexing a plurality of latches 13 loaded with the samples through a digital to analog converter, at the frequency of the controllable oscillator. The amplitude samples preferably are determined once per video field and then repetitively read out during each cycle of the baseband chroma frequency during a viewable portion of each line.

The invention includes an apparatus for synthesizing a signal having a pulse with a predetermined rise time and fall time, including a multiplying digital to analog converter 14 having data inputs, a multiplying reference input and an output, the signal level being normally determined by the data inputs. Means 57 are provided for switching a reference voltage on and off for initiating and ending the pulse. Edge sloping means 58 are connected to the switched reference voltage from the means 57 for switching, the edge sloping means having an output 17 connected to the multiplying reference input of the multiplying digital to analog converter 14, the edge sloping means having a predetermined time constant corresponding to the predetermined rise time and fall time. The edge sloping means can be an integrator 58. The signal upon which the pulse is impressed can be a video signal and the means for switching the reference voltage can be an analog switch 57 responsive to a sync separator 53. The edge sloping means is preferably an integrator 58 including an amplifier 59 having a series resistance connected between the means 57 for switching and an input to the amplifier, and a feedback path including a parallel resistance and capacitance, the predetermined time constant being defined by the resistances and the capacitance. The preferred rise time and fall time are substantially 300 $\eta$S.

The invention is subject to some variation within its scope. Variations will now occur to those skilled in the art and made aware of this disclosure. Reference should be made to the appended claims rather than the foregoing specification as indicating the true scope of the invention in which exclusive rights are claimed.

We claim:

1. A matte synthesizer for synthesizing video signal information from user inputs respecting luminance, saturation and hue, comprising:
   means for inputting user selections of said luminance, said saturation and said hue over respective ranges of adjustment;
   means for calculating a plurality of discrete amplitude samples in a cycle of a baseband video signal corresponding to a periodic wave at a reference frequency of the baseband video signal with a DC level determined by said luminance, a peak-to-peak amplitude determined by said saturation, and a phase shift determined by said hue relative to the reference frequency;
   a memory operable to store said discrete amplitude samples after calculation;
   a conversion circuit coupled to the memory and operable for sequentially converting said stored discrete amplitude samples into a continuous periodic stairstep wave at a reference frequency of the baseband video signal, said stairstep wave having a DC level reflecting a selected value of said luminance in a respective range of luminance adjustment, a peak-to-peak amplitude reflecting a selected value of said saturation in a respective range of saturation adjustment, and a phase shift relative to the reference frequency reflecting a selected value of said hue in a respective range of hue adjustment;
   a filter coupled to the conversion circuit operable to convert said continuous periodic stairstep wave into a continuous periodic sinusoidal wave by attenuating frequency components in the continuous periodic stairstep wave higher than the reference frequency; and,
   means for superimposing a synchronizing burst signal on said continuous periodic sinusoidal wave, thereby forming a composite video signal output characterizing said selected values of luminance, saturation and hue.

2. The matte synthesizer according to claim 1, wherein the means for inputting user selections includes manually displaceable controls and an encoder operable to digitize positions of the manually displaceable controls for inputting said selected values in the respective ranges.

3. The matte synthesizer according to claim 2, wherein the manually displaceable controls are continuously variable potentiometers and the encoder includes an analog to digital converter operable to produce a numeric value corresponding to the positions of the manually displaceable controls.

4. The matte synthesizer according to claim 1, wherein the means for calculating a plurality of discrete amplitude samples includes a digital processor programmed to read said numeric values converted from said user inputs respecting luminance, saturation and hue, and to calculate said discrete amplitude samples at least once per vertical field of the video signal.

5. The matte synthesizer according to claim 4, wherein said discrete amplitude samples remain constant over at least one full video field, thereby forming a matte.

6. The matte synthesizer according to claim 4, wherein the digital processor is operable to calculate four said discrete amplitude samples which are repeated during a vertical field, and wherein the discrete amplitude samples defining said continuous periodic stairstep wave are:

$$sample_1 = luminance + saturation[sin(hue)];$$

$$sample_2 = luminance + saturation[sin(hue + 0.5\ \pi)];$$

$$sample_3 = luminance + saturation[sin(hue + \pi)];\ and,$$

$$sample_4 = luminance + saturation[sin(hue + 1.5\ \pi)].$$

7. The matte synthesizer according to claim 6, wherein the conversion circuit includes a digital to analog converter, and further comprising a phase locked oscillator operating at four times a reference baseband frequency coupled to the digital to analog converter, operable sequentially to apply said four discrete amplitude samples to an output of the digital to analog converter synchronously with an output of the phase locked oscillator.

8. The matte synthesizer according to claim 7, wherein the digital to analog converter is a multiplying type, and further comprising means for applying a reference voltage to the digital to analog converter for blanking an output of the digital to analog converter during a video blanking period of a composite video signal.

9. The matte synthesizer according to claim 8, wherein the means for superimposing a synchronizing signal includes means for summing the output of the digital to analog converter and a reference black burst signal.

10. The matte synthesizer according to claim 8, further comprising means for sloping the reference voltage applied to the digital to analog converter to obtain a desired rise time in a blanking interval in the composite video signal.

11. A matte synthesizer for generating video signal information comprising:
    user inputs respecting luminance, saturation and hue, the user inputs including user control elements which are continuously variable over ranges, each of the user inputs providing an electrical output varying with positioning of a user control element;
    at least one analog to digital converter operable to digitize the electrical output of each of the user inputs, providing numerical selections of said luminance, said saturation and said hue;
    a digital processor programmed to read said numerical selections and to calculate and output a plurality of discrete amplitude samples in a cycle of a video signal corresponding to a periodic wave at a baseband chroma frequency of the video signal with a DC level determined by said luminance, a peak-to-peak amplitude determined by said saturation, and a phase shift relative to the baseband chroma frequency determined by said hue;
    at least one digital to analog converter operable to receive from the digital processor the discrete amplitude samples and to convert said discrete amplitude samples to analog levels;
    a multiplexer operable to place the discrete amplitude samples sequentially on an output at intervals during each period of the baseband chroma frequency corresponding to a number of said plurality of samples, whereby the samples are repetitively converted to an analog waveform, wherein the multiplexer is a digital multiplexer having a plurality of latches for storing the discrete amplitude samples, the digital to analog converter receiving the amplitude samples from the latches; and,
    an analog adder for superimposing a synchronizing signal on said analog waveform, thereby producing a composite video output.

12. The matte synthesizer according to claim 11, wherein the baseband chroma frequency is provided by a reference signal to the matte synthesizer, and further comprising a phase locked loop including a phase comparator and voltage controlled oscillator operable to track the reference signal and to produce an output at a multiple of the baseband chroma frequency corresponding to said number of the plurality of samples, the output of the voltage controlled oscillator being connected to the multiplexer for enabling sequential presentation to the digital to analog converter of the discrete amplitude samples from individual ones of the latches.

13. The matte synthesizer according to claim 12, wherein the multiplexer is a digital multiplexer having a plurality of latches for storing the discrete amplitude samples, the digital to analog converter receiving the amplitude samples from the latches.

14. The matte synthesizer according to claim 13, further comprising means for sloping a multiplying signal to the digital to analog converter, whereby a video blanking interval in the output of said digital to analog converter has a predetermined rise time and fall time corresponding to a slope of said multiplying signal.

15. The matte synthesizer according to claim 14, wherein the predetermined rise time and fall time are substantially 300 $\eta$S.

16. The matte synthesizer according to claim 13, further comprising a filter operable to remove frequency components from the output of the matte synthesizer at a higher frequency than the baseband chroma frequency, and wherein the summing means includes means for superimposing on said output a synchronizing burst provided by said timing reference source.

17. A method for generating a matte in the form of a composite color video signal having a user selected luminance, saturation and hue, comprising the steps of:
    providing inputs of the user selected luminance, saturation and hue, the luminance and saturation being variable within preset ranges and the hue being variable from at least 0° to 360°;
    providing a baseband chroma frequency;
    determining values of a unit sine wave at a phase shift from said baseband chroma frequency corresponding to the hue, at a plurality of spaced points within a period of the baseband chroma frequency;
    defining amplitude samples of a chroma cycle of the composite color video signal at each of said plurality of spaced points, by multiplying the unit sine wave values times the saturation and adding the luminance;
    converting the amplitude samples to analog levels and placing the amplitude samples on an output synchronously with the baseband chroma frequency and repetitively for successive cycles of the baseband chroma frequency;
    superimposing on said output a sync pulse and a color burst at the baseband chroma frequency, thereby producing a composite video output characterizing the user selected luminance, saturation and hue;
    wherein the user selected luminance, saturation and hue are input from manually variable controls, digitized and presented as numerical values to a digital processor for determining said values of the amplitude samples, wherein the unit sine wave values are determined by reference to a look-up table indexed by a phase angle of the hue, and wherein the amplitude samples are placed on the output via a digital to analog converter, and further comprising blanking an output of the digital to analog converter during a synchronizing interval.

18. The method for generating a matte according to claim 17, wherein the digital to analog converter is a multiplying type, and further comprising setting a predetermined rise time and fall time on the output of the digital to analog converter by sloping a multiplying signal to the digital to analog converter.

19. A method for generating a matte in the form of a composite color video signal having a user selected luminance, saturation and hue, comprising the steps of:
    providing inputs of the user selected luminance, saturation and hue, the luminance and saturation being variable within preset ranges and the hue being variable from at least 0° to 360°;
    providing a baseband chroma frequency;
    determining values of a unit sine wave at a phase shift from said baseband chroma frequency corresponding to the hue, at a plurality of spaced points within a period of the baseband chroma frequency;
    defining amplitude samples of a chroma cycle of the composite color video signal at each of said plurality of spaced points, by multiplying the unit sine wave values times the saturation and adding the luminance;

converting the amplitude samples to analog levels and placing the amplitude samples on an output synchronously with the baseband chroma frequency and repetitively for successive cycles of the baseband chroma frequency; and, superimposing on said output a sync pulse and a color burst at the baseband chroma frequency, thereby producing a composite video output characterizing the user selected luminance, saturation and hue, and wherein the baseband chroma frequency is provided by phase locking a controllable oscillator to a reference signal, the controllable oscillator being operable to produce a frequency at an integer multiple of the baseband frequency corresponding to a number of said samples within a period of the baseband frequency, and further comprising placing the analog levels on the output by multiplexing a plurality of latches loaded with the samples into a digital to analog converter, at the frequency of the controllable oscillator.

20. The method for generating a matte according to claim 19, wherein the integer multiple is four.

* * * * *

UNITED STATES PATENT AND TRADEMARK OFFICE
CERTIFICATE OF CORRECTION

PATENT NO. : 5,231,475

DATED : July 27, 1993

INVENTOR(S) : Ritter, et al.

It is certified that error appears in the above-identified patent and that said Letters Patent is hereby corrected as shown below:

On the title page, add:

The following prior art references were entered of record and should be identified under U.S. Patent Documents:

```
--4,636,839  1/1987   Cole et al ...............358/22
  4,758,880  7/1988   McFetridge ..............358/19
  4,642,682  2/1987   Osburn et al ............358/80
  4,542,402  7/1985   Ader ....................358/30
  4,442,428  4/1984   Dean et al ..............340/703
  4,176,373  11/1979  Dillon et al ............358/37
  4,327,373  4/1982   Gomi ....................358/28
  4,809,059  2/1989   Flumm et al .............358/27--.
```

Column 9, line 14, delete

"$sample_1 = luminance + saturation[sin(hue)]$";

and replace with

--$sample_4 = luminance + saturation[sin(hue + 1.5\pi)]$--.

Signed and Sealed this

Tenth Day of May, 1994

*Attest:*

*Attesting Officer*

BRUCE LEHMAN

*Commissioner of Patents and Trademarks*